M. R. BUIKEMA.
DIRIGIBLE LIGHT.
APPLICATION FILED JUNE 18, 1919.

1,364,708.

Patented Jan. 4, 1921.
2 SHEETS—SHEET 1.

Inventor
Menno R. Buikema

By
Attorney

M. R. BUIKEMA.
DIRIGIBLE LIGHT.
APPLICATION FILED JUNE 18, 1919.
1,364,708.
Patented Jan. 4, 1921.
2 SHEETS—SHEET 2.
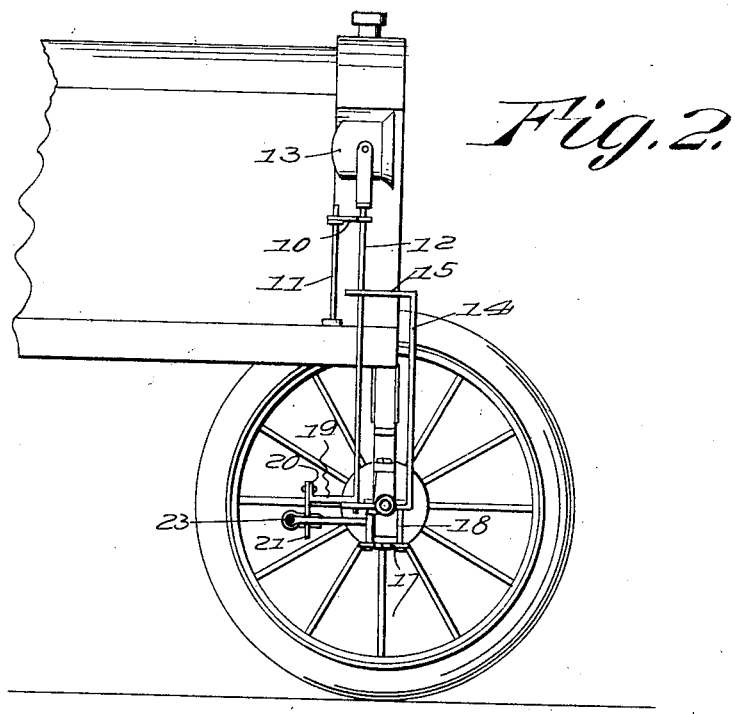
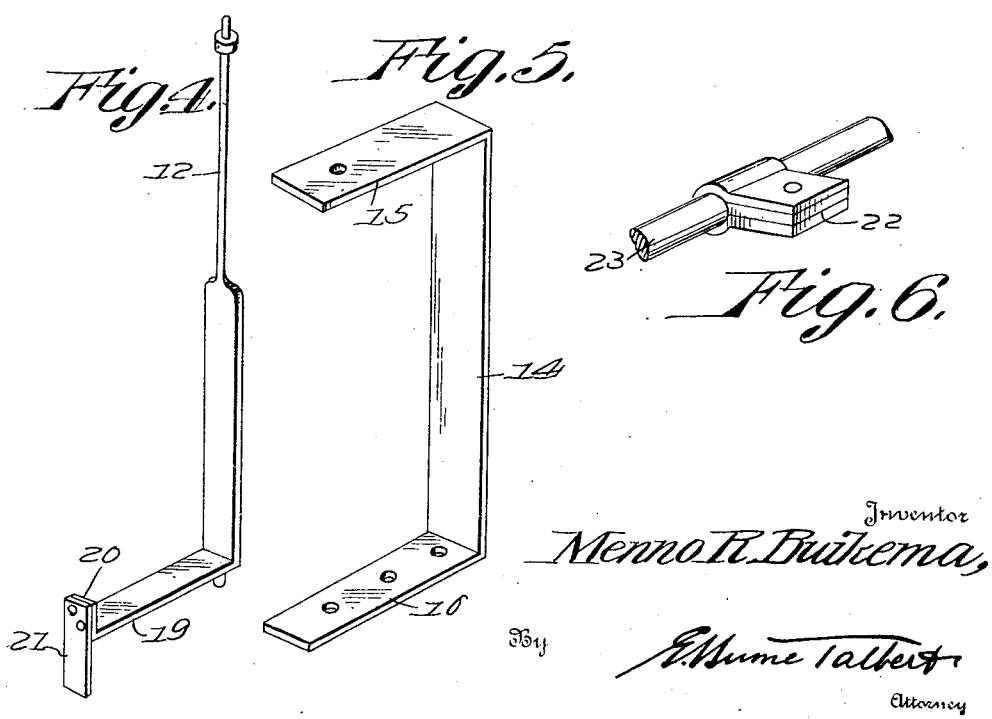
Inventor
Menno R. Buikema,

UNITED STATES PATENT OFFICE.

MENNO R. BUIKEMA, OF MORRISON, ILLINOIS.

DIRIGIBLE LIGHT.

1,364,708.     Specification of Letters Patent.     Patented Jan. 4, 1921.

Application filed June 13, 1919. Serial No. 305,176.

*To all whom it may concern:*

Be it known that I, MENNO R. BUIKEMA, a citizen of the United States, residing at Morrison, in the county of Whiteside and State of Illinois, have invented new and useful Improvements in Dirigible Lights, of which the following is a specification.

The object of the invention is to provide a dirigible light for automobiles and similar vehicles and more especially to provide a construction and arrangement of parts whereby one of the headlights (where two as ordinarily are employed) may be reflected in the direction which the vehicle is about pursue when the steering gears are moved by the steering wheel in the desired direction, while the other headlight remains in its normal position to direct the light forwardly or in line with the body of the machine.

With the ordinary construction of dirigible headlights, when operated by the steering mechanism, both headlights are moved in a common direction, and the center of the road immediately in advance of the machine is thus to a greater or less extent thrown into the shadow or is obscured, while the entire volume of light is directed beyond the side of the road or in the path which is to be pursued by the machine. By arranging the parts so that only one headlight is deflected by the operation of the steering mechanism, as for example the outside light (the right hand light if the machine is to be deflected to the left, or the left hand light if the machine is to be deflected to the right) the progressive path more or less remotely in advance of the machine is lighted, while at the same time the unaffected headlight serves to provide a sufficient and satisfactory illumination of the road immediately in advance of the machine. In other words, the driver is not deprived of the advantage of light on the portion of the road immediately in front of him, and at the same time is given the benefit of the deflection of sufficient light in the direction which he will pursue, to properly guide him in the manipulation of the machine.

With these and other objects in view, as will appear hereinafter, the invention consists in a novel construction, combination and arrangement of parts fully set forth in the following description in connection with the drawings, in which—

Fig. 2 is a side view of the same.

Figs. 4, 5 and 6 are details of detached elements of the mechanism.

Figure 1:
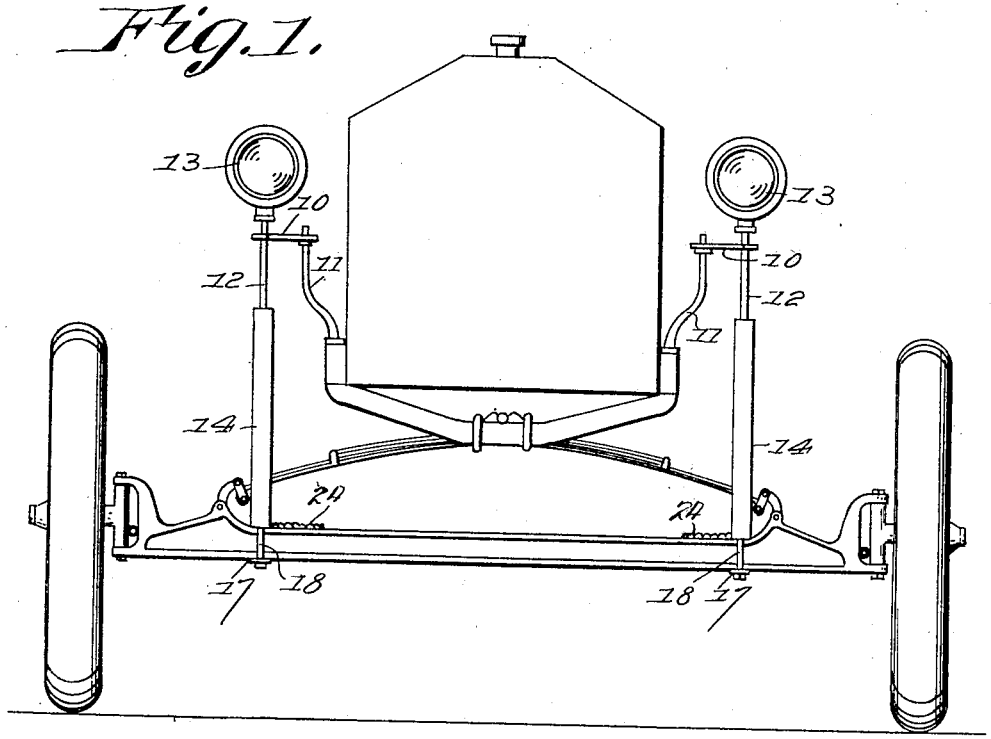
Figure 1 is a front view of a light controlling apparatus applied in the operative position to an automobile.
Figure 3:
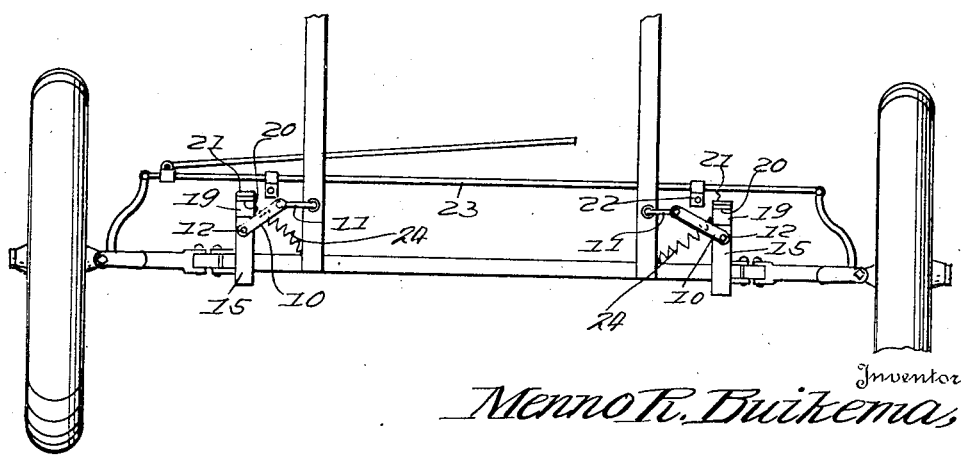
Fig. 3 is a top plan view.

Essentially the device embodying the invention consists of a supplemental lamp bracket 10, which is attached to or mounted upon the ordinary lamp bracket 11 and is extended forwardly from the ordinary bracket for the purpose of advancing the lamp to a greater or less extent so that its range of deflection may be unimpeded by the forward end of the hood of the machine. This auxiliary bracket is properly braced to give it the necessary stability and prevent undue vibration and forms the upper bearing for a lamp rod 12 upon which the lamp 13 may be secured in the ordinary or any preferred manner. At its lower end this lamp rod is mounted in a standard 14 having substantially parallel upper and lower members 15 and 16 and provided with bearings for the lamp rod, the lower member constituting a foot which serves as one member of a clamp for attachment to the forward axle of the machine, the other member of said clamp consisting of a plate 17 which is connected with the foot of the standard by means of suitable bolts 18 or the equivalent thereof.

The lamp bracket or post 12 is adapted to turn in the bearings provided in said standard and the auxiliary bracket 10 and is provided at its lower end with an arm 19 extending rearwardly beyond the axle and provided with an upturned extremity 20 with which is connected an arm 21 arranged in the path of a tappet 22 suitably clamped upon the steering rod 23 whereby as the steering rod is moved in one direction the tappet comes in contact with the arm in connection with the lamp post and moves it to turn the lamp to a greater or less extent against the tension of a coiled spring 24 which yieldingly and normally maintains the parts in position to project the light of the lamp in a forward direction. The spring 24 is tensioned between the upturned extremity of the arm 19 and the forward axle of the vehicle and tends normally to draw this upturned arm toward the tappet 22, so that the said upturned end will normally follow the movement of the tappet to effect the angular disposition of the light as described. At the other side of the machine the light controlling devices are disposed with their parts in such relative positions that the movement of the steering rod in the opposite direction will serve to deflect the light in the reverse direction while the lamp at the first named side of the machine remains stationary. Under these conditions as above indicated, the manipulation of the steering mechanism of the machine to turn the steering wheels in one direction or the other serves to divert the light of only one lamp while the other maintains its normal position so as to give the driver of the vehicle the advantage of an illumination covering the complete prospective path of the machine. Obviously as the vehicle rounds a curve or corner and the steering wheel is brought back to a position alining the forward wheels with the body of the vehicle, the deflection of the beam of light from the diverted lamp is permitted to approach its normal direction where it remains until readjusted by a further operation of the steering device.

What is claimed is:—

In a dirigible headlight for automobiles and like vehicles, the combination with the main lamp bracket, of a supplemental lamp bracket attached to the main lamp bracket and extending forwardly of the same, a lamp rod journaled adjacent its upper end in the supplemental bracket, and a standard having substantially parallel upper and lower members of which the latter constitutes the foot for attachment to the forward axle of the vehicle, the lamp rod having pivotal engagement with the said upper and lower members and being provided at its lower end with an arm extending rearwardly beyond the vehicle axle and provided with an upturned extremity to which is connected a depending arm, and a tappet clamped on the steering rod of the vehicle for contact with the said depending arm upon movement of the said steering rod, the lamp rod being provided with yielding means mounted to oppose movement of the rod by the tappet.

In testimony whereof I affix my signature.

MENNO R. BUIKEMA.